United States Patent
Mader et al.

(10) Patent No.: US 7,091,697 B2
(45) Date of Patent: Aug. 15, 2006

(54) SYSTEM AND METHOD FOR EFFICIENTLY IMPLEMENTING A BATTERY CONTROLLER FOR AN ELECTRONIC DEVICE

(75) Inventors: Urs H. Mader, Cupertino, CA (US); Hideyuki Sato, Chiba (JP)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 139 days.

(21) Appl. No.: 10/700,812

(22) Filed: Nov. 4, 2003

(65) Prior Publication Data

US 2005/0093512 A1    May 5, 2005

(51) Int. Cl.
H02J 7/00 (2006.01)
H02J 7/16 (2006.01)
H02J 7/06 (2006.01)
H02J 7/24 (2006.01)

(52) U.S. Cl. .............. 320/120; 320/140; 320/114; 320/158; 320/110; 320/107

(58) Field of Classification Search ........... 320/114, 320/112, 134, 135, 120, 164, 108, 127, 158, 320/159; 307/49, 66, 65, 61, 77, 48, 64, 307/80, 87, 45, 75; 396/279, 281, 301, 303; 702/61; 327/536; 324/426
See application file for complete search history.

(56) References Cited

U.S. PATENT DOCUMENTS

| | | | | |
|---|---|---|---|---|
| 5,164,761 A | * | 11/1992 | Isono et al. | 396/279 |
| 5,389,998 A | * | 2/1995 | Dunsmore et al. | 396/301 |
| 5,455,499 A | * | 10/1995 | Uskali et al. | 340/636.1 |
| 5,557,188 A | * | 9/1996 | Piercey | 320/134 |
| 5,680,027 A | * | 10/1997 | Hiratsuka et al. | 320/106 |
| 5,784,105 A | * | 7/1998 | Kawamura | 348/372 |
| 5,985,480 A | | 11/1999 | Sato et al. | 429/65 |
| 6,037,750 A | * | 3/2000 | Von Novak | 320/132 |
| 6,098,095 A | * | 8/2000 | Nelson et al. | 709/208 |
| 6,184,659 B1 | * | 2/2001 | Darmawaskita | 320/139 |
| 6,335,611 B1 | | 1/2002 | Sasaki | 320/134 |
| 6,339,413 B1 | * | 1/2002 | Drake et al. | 345/50 |
| 6,340,889 B1 | * | 1/2002 | Sakurai | 324/433 |

* cited by examiner

Primary Examiner—Karl Easthom
Assistant Examiner—Alexis Boateng
(74) Attorney, Agent, or Firm—Gregory J. Koerner; Redwood Patent Law

(57) ABSTRACT

A system and method for effectively managing operating power for an electronic device may include a battery pack coupled to the electronic device for supplying operating power to the electronic device. A battery controller may be configured as a single integrated-circuit device to alternately manage the battery pack either in a single-cell implementation or in a dual-cell implementation. The battery controller may include a charge pump device to provide an internal controller power supply for operating the battery controller in the single-cell implementation.

10 Claims, 7 Drawing Sheets

SYSTEM AND METHOD FOR EFFICIENTLY IMPLEMENTING A BATTERY CONTROLLER FOR AN ELECTRONIC DEVICE

BACKGROUND SECTION

1. Field of the Invention

This invention relates generally to techniques for managing operating power of electronic devices, and relates more particularly to a system and method for effectively implementing a battery controller for an electronic device.

2. Description of the Background Art

Implementing efficient methods for managing operating power is a significant consideration for designers and manufacturers of contemporary electronic devices. However, effectively managing operating power for electronic devices may create substantial challenges for system designers. For example, enhanced demands for increased power management functionality and performance may require more system processing power and require additional hardware resources. An increase in processing or hardware requirements may also result in a corresponding detrimental economic impact due to increased production costs and operational inefficiencies.

Furthermore, enhanced system capability to perform various advanced power management operations may provide additional benefits to a system user, but may also place increased demands on the control and management of various system components. For example, an enhanced power management system that effectively monitors currently remaining operating power for an electronic device may benefit from an effective implementation because of the importance of accurately indicating the currently-remaining available operating time for electronic device to a device user.

In certain operational environments that involve portable electronics devices, knowing in advance when a given battery pack will become fully-discharged is an issue of some importance to a device user. For example, when using a digital camera device to capture image data, failure to provide sufficient operating power to the digital camera device may temporarily prevent capture of additional image data at a critical point in time.

Due to growing demands on system resources and the importance of successfully and accurately providing sufficient operating power to electronic devices, it is apparent that developing new techniques for managing operating power is a matter of concern for related electronic technologies. Therefore, for all the foregoing reasons, developing efficient systems for managing operating power remains a significant consideration for designers, manufacturers, and users of contemporary electronic devices.

SUMMARY

In accordance with the present invention, a system and method for effectively implementing a battery controller for an electronic device are disclosed. In one embodiment, the battery controller may be implemented as a single-chip integrated circuit device that controls various functionalities of a battery pack for effectively providing operating power to the electronic device. In accordance with certain embodiments of the present invention, the battery controller may be selectively configured to control the battery pack in either a single-cell implementation or a dual-cell implementation.

In a single-cell implementation in which the battery pack provides a reduced battery supply voltage, the battery controller may utilize a charge pump to convert the battery supply voltage into a sufficient internal controller power supply for operating the battery controller. The battery controller may thus effectively utilize the foregoing charge pump to compensate for the reduced battery supply voltage resulting from a single-cell implementation of the battery pack.

Under certain conditions, the battery controller may open a discharge switch to prevent overdischarging the battery pack. In addition, the battery controller may also open a charge switch to prevent overcharging the battery pack under other conditions. In certain embodiments, the battery controller may utilize an internal negative charge pump to provide a negative charge-pump output voltage for generating an enhancement voltage so that the charge switch and the discharge switch may exhibit sufficiently low on-state resistances when turned on.

Certain embodiments of the battery controller may also include a UART device to perform various bi-directional communications between the battery controller and appropriate external entities such as a processor of the corresponding electronic device. The UART device may be advantageously implemented to communicate with the electronic device via a single transmit/receive pin on the integrated circuit device that contains the battery controller. In addition, the UART device may advantageously receive a timebase signal from a precision on-chip instruction oscillator of the battery controller for accurately generating a UART clock signal to synchronize operations in the UART device. For at least the foregoing reasons, the present invention thus provides an improved system and method for effectively implementing a battery controller for an electronic device.

DETAILED DESCRIPTION

The present invention relates to an improvement in power management techniques. The following description is presented to enable one of ordinary skill in the art to make and use the invention and is provided in the context of a patent application and its requirements. Various modifications to the disclosed embodiments will be readily apparent to those skilled in the art, and the generic principles herein may be applied to other embodiments. Thus, the present invention is not intended to be limited to the embodiments shown, but is to be accorded the widest scope consistent with the principles and features described herein.

The present invention comprises a system and method for effectively managing operating power for an electronic device, and may include a battery pack coupled to the electronic device for supplying operating power to the electronic device. A battery controller may be configured as a single integrated-circuit device to alternately manage the battery pack either in a single-cell implementation or in a dual-cell implementation. The battery controller may advantageously include a charge pump device to provide an internal controller power supply for operating the battery controller in the foregoing single-cell implementation.

Figure 1:
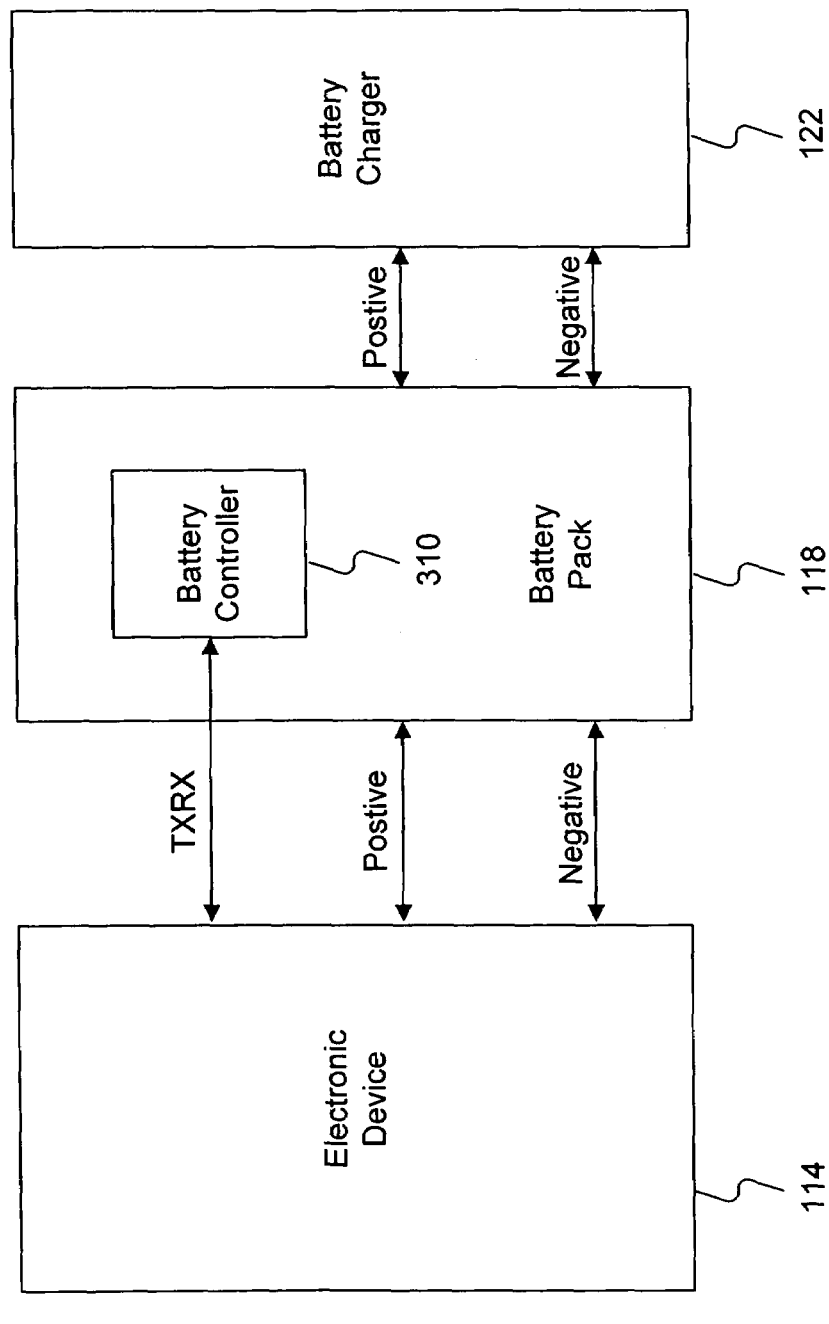
FIG. 1 is a block diagram for one embodiment of an electronic system, in accordance with the present invention.

Referring now to FIG. 1, a block diagram for one embodiment of an electronic system 110 is shown, in accordance with the present invention. In the FIG. 1 embodiment, electronic system 110 may include, but is not limited to, an electronic device 114, a battery pack 118, a battery charger 122, and a battery controller 310. In alternate embodiments, electronic system 110 may readily include various other components in addition to, or instead of, those components discussed in conjunction with the FIG. 1 embodiment.

In the FIG. 1 embodiment, electronic device 114 may be connected to battery pack 118 through a positive path and a negative path to receive operating power. Battery controller 310 may perform various power management functions with regard to battery pack 118, and may also perform bi-directional communication procedures with electronic device 114 through a transmit/receive (TXRX) path. In the FIG. 1 embodiment, a battery (one or more battery cells) in battery pack 118 may be connected to battery charger 122 through a positive charge path and a negative charge path for recharging the battery cell(s) in battery pack 118. The operation and utilization of electronic system 110 is further discussed below in conjunction with FIGS. 2–7.

Figure 2:
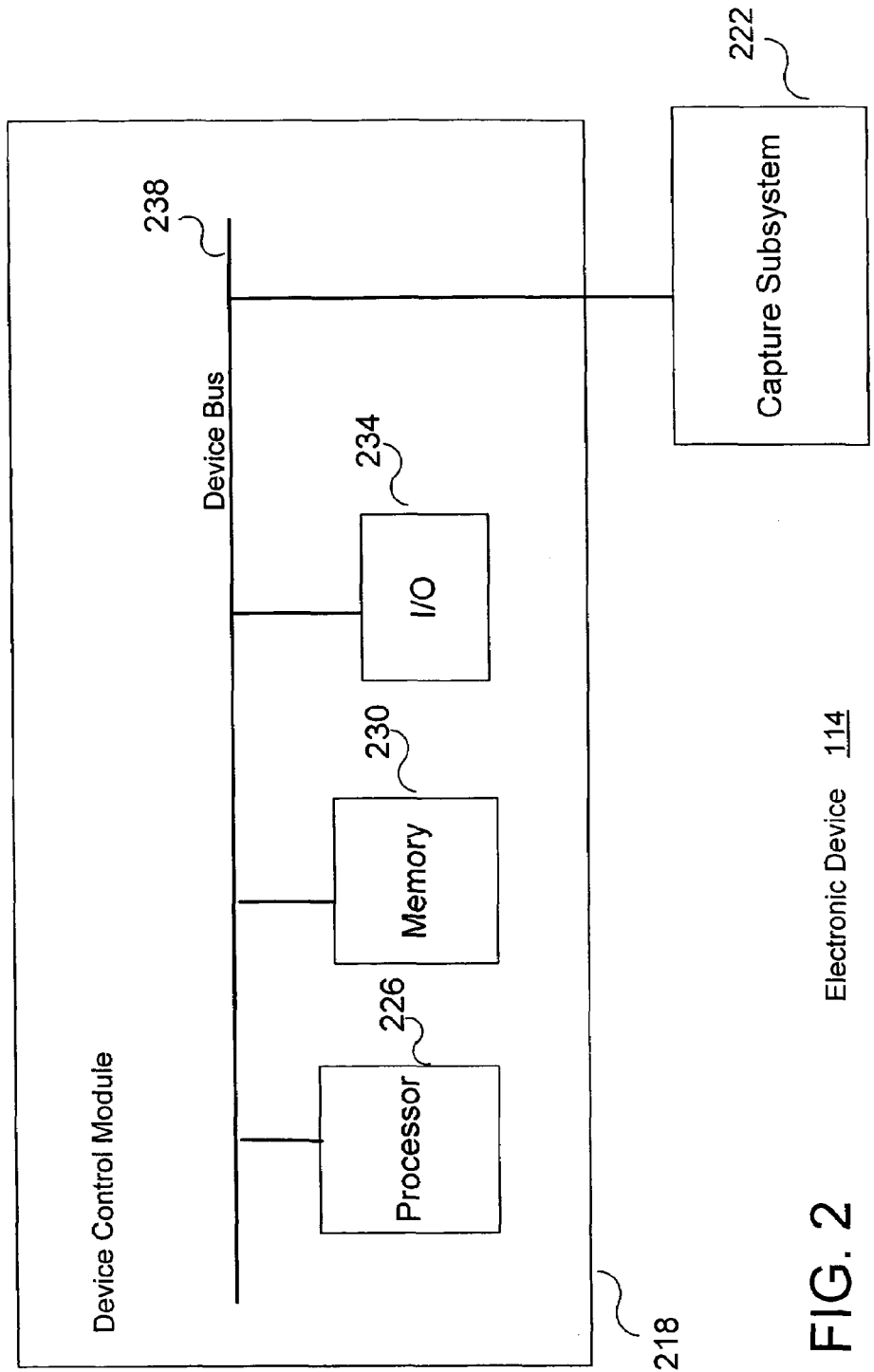
FIG. 2 is a block diagram for one embodiment of the electronic device of FIG. 1, in accordance with the present invention.

Referring now to FIG. 2, a block diagram for one embodiment of the FIG. 1 electronic device 114 is shown, in accordance with the present invention. For purposes of illustration, the FIG. 2 electronic device 114 is shown as being implemented as a digital camera device. However, in alternate embodiments, electronic device 114 may readily be implemented as any other appropriate type of portable or stationary electronic device or system that requires operating power.

In the FIG. 2 embodiment, electronic device 114 includes, but is not limited to, a capture subsystem 222 and a device control module 218. In alternate embodiments, electronic device 114 may readily include various other components in addition to, or instead of, those components discussed in conjunction with the FIG. 2 embodiment.

In the FIG. 2 embodiment, electronic device 114 may utilize capture subsystem 222 to selectively capture image data corresponding to a target object via reflected light impacting an image sensor along an optical path. The foregoing image sensor, which may preferably include a charged-coupled device (CCD), may responsively generate a set of image data representing the target object. The image data may then be routed over device bus 238 to device control module 218 for appropriate processing and storage.

In the FIG. 2 embodiment, device control module 218 may include, but is not limited to, a processor 226, a memory 230, and one or more input/output interface(s) (I/O) 234. Processor 226, memory 230, and I/O 234 may each be coupled to, and communicate, via common device bus 238 that also communicates with capture subsystem 222. In the FIG. 2 embodiment, processor 226 may preferably be implemented to include any appropriate microprocessor device for controlling electronic device 114.

Memory 230 may preferably be implemented as one or more appropriate storage devices, including, but not limited to, read-only memory, random-access memory, and various types of non-volatile memory, such as floppy disc devices, hard disc devices, or flash memory. I/O 234 preferably may provide one or more effective interfaces for facilitating bi-directional communications between electronic device 114 and any external entity, including a system user or another electronic device.

In the FIG. 2 embodiment, memory 230 may include, but is not limited to, a camera application of program instructions that may be executed by processor 226 to perform various functions and operations for electronic device 114. Memory 230 may also include a camera operating system that preferably controls and coordinates low-level functionality of electronic device 114.

Figure 3:
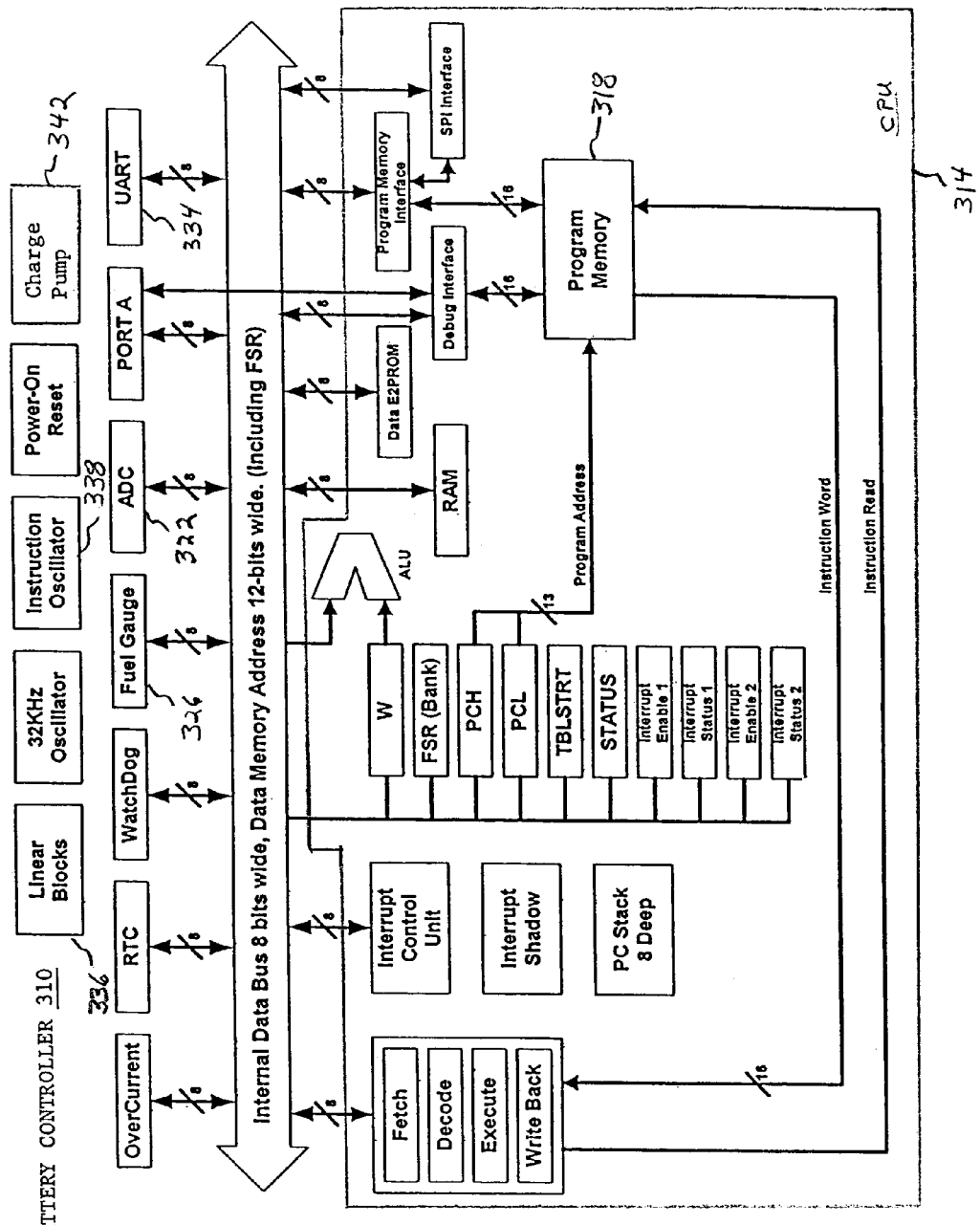
FIG. 3 is a block diagram for one embodiment of the battery controller of FIG. 1, in accordance with the present invention.

Referring now to FIG. 3, a block diagram for one embodiment of the FIG. 1 battery controller 310 is shown, in accordance with the present invention. In alternate embodiments of the present invention, battery controller 310 may readily be implemented to include various other configurations, and may also include various elements and components in addition to, or instead of, those discussed in conjunction with the FIG. 3 embodiment.

In the FIG. 3 embodiment, battery controller 310 may be implemented as a single-chip integrated circuit device that is integral with battery pack 118 (FIG. 1). In the FIG. 3 embodiment, battery controller 310 may include a central processing unit (CPU) 314 which may be implemented to include any appropriate type of microprocessor device for controlling the functionality of battery controller 310. For example, CPU 314 may be effectively implemented as a reduced-instruction-set computer (RISC) processor that executes battery controller instructions from program memory 318 to control the operation of battery controller 310.

In the FIG. 3 embodiment, battery controller 310 may also include, but is not limited to, an analog-to-digital converter (ADC) module 322, a fuel gauge module 326, a universal asynchronous receiver/transmitter (UART) 334, linear blocks 336, an instruction oscillator 338, and a charge pump 342. In the FIG. 3 embodiment, battery controller 310 may utilize ADC module 322 to monitor battery voltage from one or more battery cells of battery pack 118 (FIG. 1). CPU 314 may then utilize the foregoing measured battery voltage as one input value in a battery capacity algorithm for calculating currently-remaining operating power in battery pack 118. Similarly, battery controller 310 may utilize fuel gauge module 326 to monitor electrical current going into and out of the battery cell(s) of battery pack 118 for use as another input value for the foregoing battery capacity algorithm.

In the FIG. 3 embodiment, battery controller 310 may utilize UART 334 and instruction oscillator 338 to perform various bi-directional communications between battery controller 310 and appropriate external entities, as further discussed below in conjunction with FIG. 7. In the FIG. 3 embodiment, battery controller 310 may utilize linear blocks 336 (linear voltage regulators) and charge pump 342 to provide an internal controller power supply for operating various analog and digital circuits of battery controller 310. The implementation and utilization of linear blocks 336 and charge pump 342 are further discussed below in conjunction with FIGS. 4–5.

Figure 4:
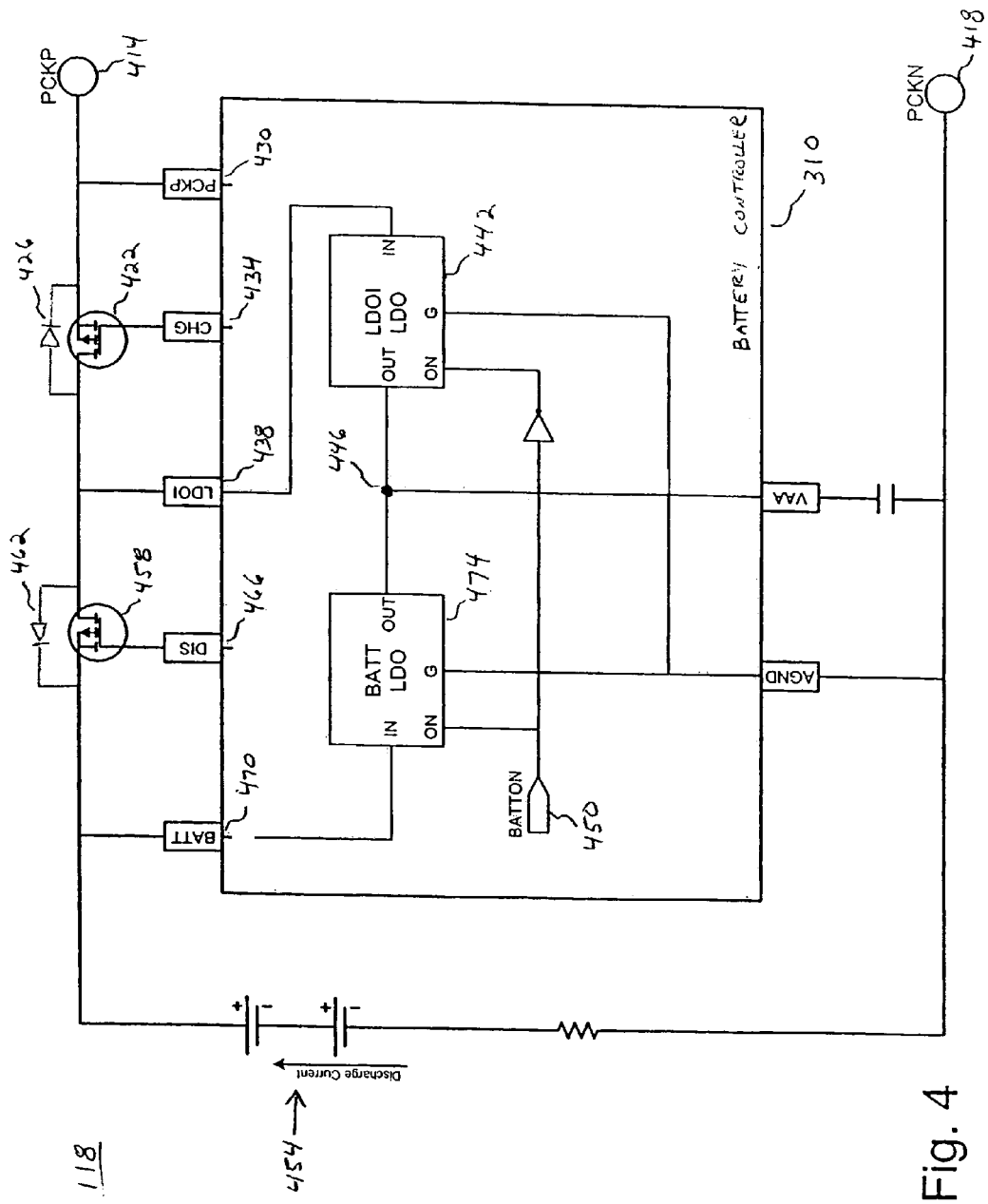
FIG. 4 is a schematic diagram of selected components from one embodiment of the battery pack of FIG. 1.

Referring now to FIG. 4, a schematic diagram of selected components from one embodiment of FIG. 1 battery pack 118 is shown. In alternate embodiments, battery pack 118 may readily include various components and configurations in addition to, or instead of, those discussed in conjunction with the FIG. 4 embodiment.

In the FIG. 4 embodiment, battery pack 118 may include battery controller 310 (FIG. 1) and a battery 454 which may be implemented by utilizing two battery cells. In certain embodiments, the foregoing battery cells may be implemented as lithium-ion battery cells that each supply approximately 4.2 Volts to produce a total voltage of approximately 8.4 Volts when fully-charged.

In the FIG. 4 embodiment, battery pack 118 may also include a charge switch 422 and a discharge switch 458 that are connected in a series configuration in the positive charge path of battery pack 118, with charge switch 422 being connected directly to a positive charger terminal (PCKP) 414, and with discharge switch 458 being connected to the positive side of battery 454. In the FIG. 4 embodiment, both charge switch 422 and discharge switch 458 may be implemented as P-channel field-effect transistors (FETs). In addition, in the FIG. 4 embodiment, charge switch 422 may be connected in parallel with a body diode 426, and discharge switch 458 may be connected in parallel with a body diode 462.

In operation, battery controller 310 may advantageously open discharge switch 458 to prevent overdischarging battery 454 below a minimum voltage level to thereby avoid permanently damaging battery 454. In addition, battery controller 310 may also open charge switch 426 to prevent overcharging battery 454 above a maximum voltage level to thereby avoid certain hazardous conditions that may result from such overcharging of battery 454.

In certain other embodiments, charge switch 422 and discharge switch 458 may alternately be implemented by utilizing N-channel field-effect transistors (FETs) that are connected in a series configuration in the negative charge path of battery pack 118, with charge switch 422 being connected directly to negative charger terminal (PCKN) 418, and with discharge switch 458 being connected to the negative side of battery 454.

In the FIG. 4 embodiment, battery controller 310 may advantageously coordinate a startup procedure and a shutdown procedure for battery pack 118. In practice, when battery 454 is in a discharged state, a device user may connect battery charger 122 (FIG. 1) to PCKP 414 and PCKN 418 to thereby initiate the foregoing startup procedure. Battery controller 310 may utilize the charger voltage at PCKP 414 to turn on charge switch 422 which then passes the charger voltage through LDOI pin 438 to the input of charger regulator (LDOI LDO) 442.

Charger regulator 442 may thus output a regulated internal controller power supply 446 so that CPU 314 may begin executing battery controller instructions to control the operation of battery pack 118. In addition, CPU 314 may turn on discharge switch 458 to allow discharging battery 454. In the FIG. 4 embodiment, CPU 314 may further utilize a BATTON line 450 to switch from charger regulator 442 to a battery regulator (BATT LDO) 474 which may then regulate battery voltage from BATT pin 470 to thereby provide the regulated internal controller power supply 446 for operating battery controller 310.

After battery 454 has been charged, battery pack 122 may be disconnected for more unrestricted use of electronic device 114 (FIG. 1), and electronic device 114 may then utilize battery 454 for operating power. CPU 314 may utilize ADC module 322 (FIG. 3) of battery controller 310 to monitor battery 454 as it discharges. When a pre-determined discharged voltage level is reached in battery 454, CPU 314 may responsively initiate a shutdown procedure for battery pack 118. For example, CPU 314 may open discharge switch 462, and may also toggle BATTON line 450 to switch battery controller 310 back to charger regulator 442 for the internal controller power supply 446. If battery charger 122 is not connected to battery pack 118, then the internal controller power supply 446 of battery controller 310 will descend below a reset threshold, and battery pack 118 will enter a shutdown state until battery charger 122 is connected, and the previously-described startup procedure may be repeated.

In certain embodiments, it may be desirable or advantageous to implement battery 454 by utilizing a single battery cell. Such a single-cell implementation, however, would provide only half the amount of battery voltage to drive battery regulator 474, which would therefore result in a corresponding significant voltage reduction in the internal controller power supply 446 of battery controller 310. The analog and digital components of battery pack 118 may thus lack the required operating voltage to function properly. One embodiment for an effective single-cell implementation of battery pack 118 is discussed below in conjunction with FIG. 5.

Figure 5:
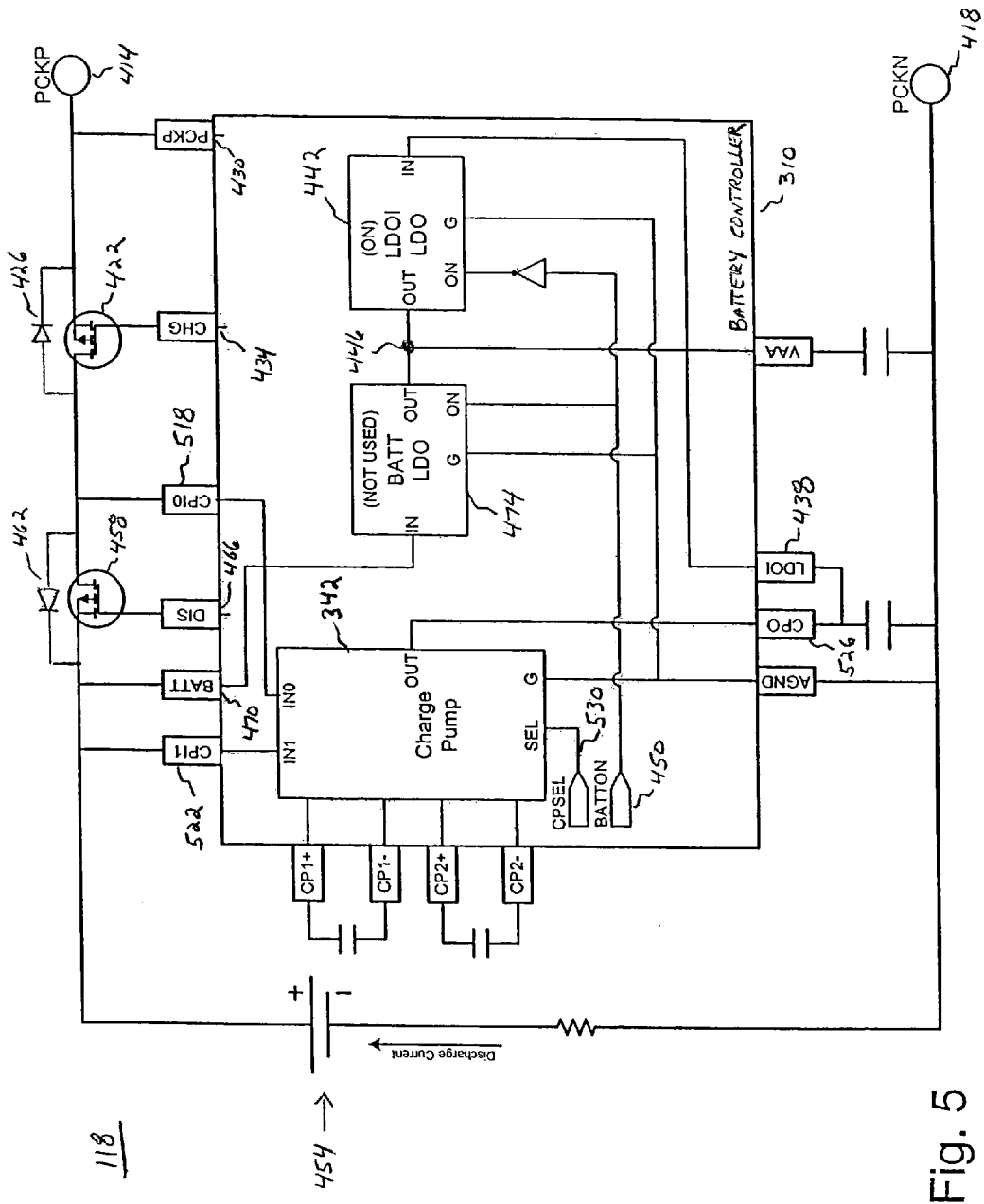
FIG. 5 is a schematic diagram of selected components from one embodiment of the battery pack of FIG. 1, in accordance with the present invention.

Referring now to FIG. 5, a schematic diagram of selected components from one embodiment of FIG. 1 battery pack 118 is shown, in accordance with the present invention. In alternate embodiments, the present invention may readily utilize various components and configurations in addition to, or instead of, those discussed in conjunction with the FIG. 5 embodiment.

In the FIG. 5 embodiment, battery pack 118 may include battery controller 310 (FIG. 1) and a battery 454 which may be implemented by utilizing a single battery cell. A single-cell implementation of battery 454 may be selected for various factors, such as lower manufacturing costs and reduced size and weight of battery pack 118. In certain embodiments, the foregoing battery cell may be implemented as a lithium-ion battery cell that supplies approximately 4.2 Volts when fully-charged.

In the FIG. 5 embodiment, battery pack 118 may also include a charge switch 422 and a discharge switch 458 that are connected in a series configuration in the positive charge path of battery pack 118, with charge switch 422 being connected directly to a positive charger terminal (PCKP) 414, and with discharge switch 458 being connected to the positive side of battery 454. In the FIG. 5 embodiment, both charge switch 422 and discharge switch 458 may be implemented as P-channel field-effect transistors (FETs). In addition, in the FIG. 5 embodiment, charge switch 422 may be connected in parallel with a body diode 426, and discharge switch 458 may be connected in parallel with a body diode 462.

In operation, battery controller 310 may advantageously open discharge switch 458 to prevent overdischarging battery 454 below a minimum voltage level to thereby avoid permanently damaging battery 454. In addition, battery controller 310 may also open charge switch 426 to prevent overcharging battery 454 above a maximum voltage level to thereby avoid certain hazardous conditions that may result from such overcharging of battery 454.

In certain other embodiments, charge switch 422 and discharge switch 458 may alternately be implemented by utilizing N-channel field-effect transistors (FETs) that may be connected in a series configuration in the negative charge path of battery pack 118, with charge switch 422 being connected directly to negative charger terminal (PCKN) 418, and with discharge switch 458 being connected to the negative side of battery 454.

In the FIG. 5 embodiment, battery controller 310 may advantageously coordinate a startup procedure and a shutdown procedure for battery pack 118. In practice, when battery 454 is in a discharged state, a device user may connect battery charger 122 (FIG. 1) to PCKP 414 and PCKN 418 to thereby initiate the foregoing startup procedure. Battery controller 310 may utilize the charger voltage at PCKP 414 to turn on charge switch 422 which then passes charger voltage through CPI0 pin 518 to a charger input (IN0) of charge pump 342.

In accordance with the present invention, battery controller 310 may utilize charge pump 342 to advantageously regulate voltage levels received at either of two selectable charge pump inputs to produce a desired charge pump output voltage by utilizing any appropriate means. In the FIG. 5 embodiment, charge pump 342 may operate in either a 1× mode, a 1.5 mode, or a 2× mode, depending upon how low the charge pump input voltage is with respect to the desired charge pump output voltage. In 1× mode, the charge pump output voltage may be approximately equal to the charge pump input voltage. In 1.5× mode, the charge pump output voltage may be approximately 1.5 times the charge pump input voltage, and in 2× mode, the charge pump output voltage may be approximately twice the charge pump input voltage. These foregoing selectable charge pump modes may be controlled by dedicated voltage comparators on the CPI0 and CPI1 inputs of charge pump 342 to thereby conserve unnecessary current consumption caused by providing unnecessarily high operating voltages to battery controller 310.

In the FIG. 5 embodiment, charge pump 342 may pass the charge pump output voltage through CPO pin 526 and LDOI pin 438 to the input of charger regulator (LDOI LDO) 442. In the FIG. 5 embodiment, the foregoing charge pump output voltage may be approximately 4 Volts. Charger regulator 442 may then filter the charge pump output voltage to provide a clean and regulated internal controller power supply 446 so that CPU 314 may begin executing battery controller instructions to control the operation of battery pack 118.

In addition, CPU 314 may turn on discharge switch 458 to allow discharging battery 454. In the FIG. 5 embodiment, CPU 314 may further utilize a CPSEL line 530 to switch from the charger input (IN0) of charge pump 342 to a battery input (IN1) of charge pump 342. Charge pump 342 may then regulate battery voltage received from CPI1 pin 522 to thereby generate the charge pump output voltage at CPO pin 526. In the FIG. 5 embodiment, the charge pump output voltage at CPO pin 526 may be approximately 4 Volts. Battery controller 310 may thus effectively utilize charge pump 342 to compensate for the lower battery voltage resulting from the single-cell implementation of battery 454. As discussed above, charger regulator 442 may then utilize the charge pump output voltage to generate internal controller power supply 446 for operating battery controller 310.

In the FIG. 5 embodiment, CPU 314 may maintain BATTON line 450 at a value that permanently selects charge regulator 442 for providing internal controller power supply 446. In the single-cell implementation of FIG. 5, battery regulator 474 is typically not utilized. However, the FIG. 5 battery controller 310 may advantageously be implemented as a single integrated circuit device to include battery regulator 474 and other associated components necessary to utilize battery controller 310 in either the dual-cell implementation of battery pack 118 that was discussed above in conjunction with FIG. 4, or in the single-cell implementation discussed here in conjunction with FIG. 5. In the FIG. 5 embodiment, selection of either single-cell mode or dual-cell mode for battery controller 310 may be determined by how connection pins from the integrated circuit device of battery controller 310 are connected.

In the FIG. 5 embodiment, after battery 454 has been charged, battery pack 122 may be disconnected for more unrestricted use of electronic device 114 (FIG. 1), and electronic device 114 may then utilize battery 454 for operating power. CPU 314 may utilize ADC module 322 (FIG. 3) of battery controller 310 to monitor battery 454 as it discharges. When a pre-determined discharged voltage level is reached in battery 454, CPU 314 may initiate a shutdown procedure for battery pack 118.

For example, CPU 314 may open discharge switch 462, and may also toggle CPSEL line 530 to switch battery controller 310 back to the charger input (IN0) of charge pump 342 for utilizing charger voltage from battery charger 122 to generate the internal controller power supply 446. If battery charger 122 is not connected to battery pack 118, then the internal controller power supply 446 of battery controller 310 will descend below a reset threshold, and battery pack 118 will enter a shutdown state until battery charger 122 is connected, and the previously described startup procedure may be repeated.

In accordance with the present invention, charge pump 342 and the other circuitry of battery controller 310 may be implemented to prevent any leakage current to be drawn from battery 454 in shutdown mode. Furthermore, opening discharge switch 458 effectively disconnects battery from positive charger terminal (PCKP) 414 to eliminate any current leakage through the charge path. Battery pack 118 may thus draw zero microamps of shutdown current from battery 454 during shutdown mode.

For purposes of illustration, the FIG. 4 and FIG. 5 embodiments are discussed above in the context of a single-cell implementation and a dual-cell implementation. However, the principles and concepts of the present invention may readily be applied to battery controllers of any battery pack design that may be operated in environments in which a reduced-cell implementation and an increased-cell implementation of a particular battery pack may result in variable amounts of battery supply voltage for operating the battery controller. For at least the foregoing reasons, the present invention thus provides an improved system and method for effectively implementing a battery controller 310 for an electronic device 114.

Figure 6:
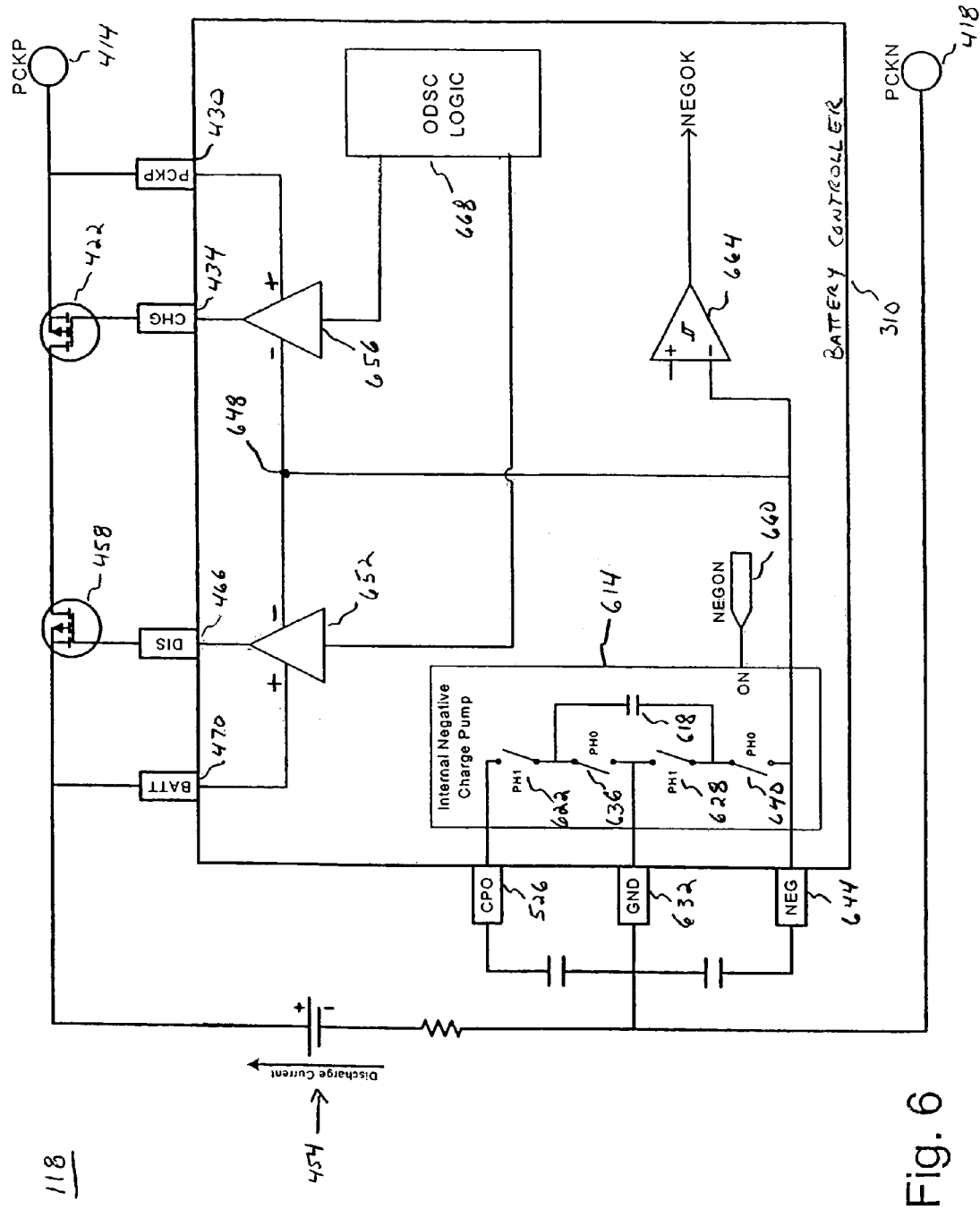
FIG. 6 is a schematic diagram of selected components from one embodiment of the battery pack of FIG. 1, in accordance with the present invention.

Referring now to FIG. 6, a schematic diagram of selected components from one embodiment of FIG. 1 battery pack 118 is shown, in accordance with the present invention. In alternate embodiments, the present invention may readily utilize various components and configurations in addition to, or instead of, those discussed in conjunction with the FIG. 6 embodiment.

In certain embodiments of battery pack 118, battery controller 310 may provide an enhancement voltage to turn on charge switch 422 via CHG pin 434. Similarly, battery controller 310 may provide an enhancement voltage to turn on discharge switch 458 via DIS pin 466. However, when battery 454 is implemented with a single battery cell as discussed above in conjunction with FIG. 5, then, even with the gates of charge switch 422 and discharge switch 458 pulled to a ground potential of zero Volts, there may not be sufficient enhancement voltage to completely turn on charge switch 422 and discharge switch 458.

In the FIG. 6 embodiment, battery controller 310 may utilize a charge amplifier 656 to provide the enhancement voltage for turning on charge switch 422 via CHG pin 434. Similarly, battery controller 310 may utilize a discharge amplifier 652 to provide the enhancement voltage for turning on discharge switch 458 via DIS pin 466. Charge amplifier 656 may receive a positive voltage from battery charger 122 via PCKP pin 430, and discharge amplifier 652 may receive a positive voltage from battery 454 via BATT pin 470. In the FIG. 6 embodiment, the forgoing positive voltages may typically be as low as approximately 2 Volts for a fully-discharged battery cell.

Instead of connecting charge amplifier 656 and discharge amplifier 652 to ground, the FIG. 6 embodiment advantageously connects charge amplifier 656 and discharge amplifier 652 to a negative charge pump output 648 of an internal negative charge pump 614 in battery controller 310. In the FIG. 6 embodiment, internal negative charge pump 614 may provide a negative 2 Volts as the negative charge pump output 648. Charge amplifier 656 and discharge amplifier 652 may thus each generate a minimum of approximately 4 Volts of enhancement voltage so that charge switch 422 and discharge switch 458 may exhibit sufficiently low on-state resistances when turned on.

In the FIG. 6 embodiment, a phase 1 (PH1) switch 622 and a phase 1 (PH1) switch 628 may be closed to charge capacitor 618 with a charge pump output voltage from charge pump 342 (see FIG. 5) of battery controller 310 via CPO pin 526. Then, phase 1 switch 622 and phase 1 switch 628 may be opened, and a phase 0 (PH0) switch 636 and a phase 0 (PH0) switch 640 may be closed to provide the negative charge pump output 644 (NEG) from internal negative charge pump 614 to both charge amplifier 656 and discharge amplifier 652. In the FIG. 6 embodiment, CPU 314 of battery controller 310 may utilize NEGON line 660 to activate or deactivate internal negative charge pump 614.

As discussed above in conjunction with FIGS. 4 and 5, in certain embodiments, charge switch 422 and discharge switch 458 may alternately be implemented by utilizing N-channel field-effect transistors (FETs) that are connected in a series configuration in the negative charge path of battery pack 118, with charge switch 422 being connected directly to negative charger terminal (PCKN) 418, and with discharge switch 458 being connected to the negative side of battery 454. In an embodiment using N-channel field-effect transistors for charge switch 422 and discharge switch 458, battery controller 310 may not require the internal negative charge pump 614 discussed here in conjunction with FIG. 5 because battery controller 310 may advantageously utilize the charge pump output voltage of charge pump 342 (FIG. 5) on CPO pin 526 to generate sufficient enhancement voltage for completely turning on charge switch 422 and discharge switch 458.

Figure 7:
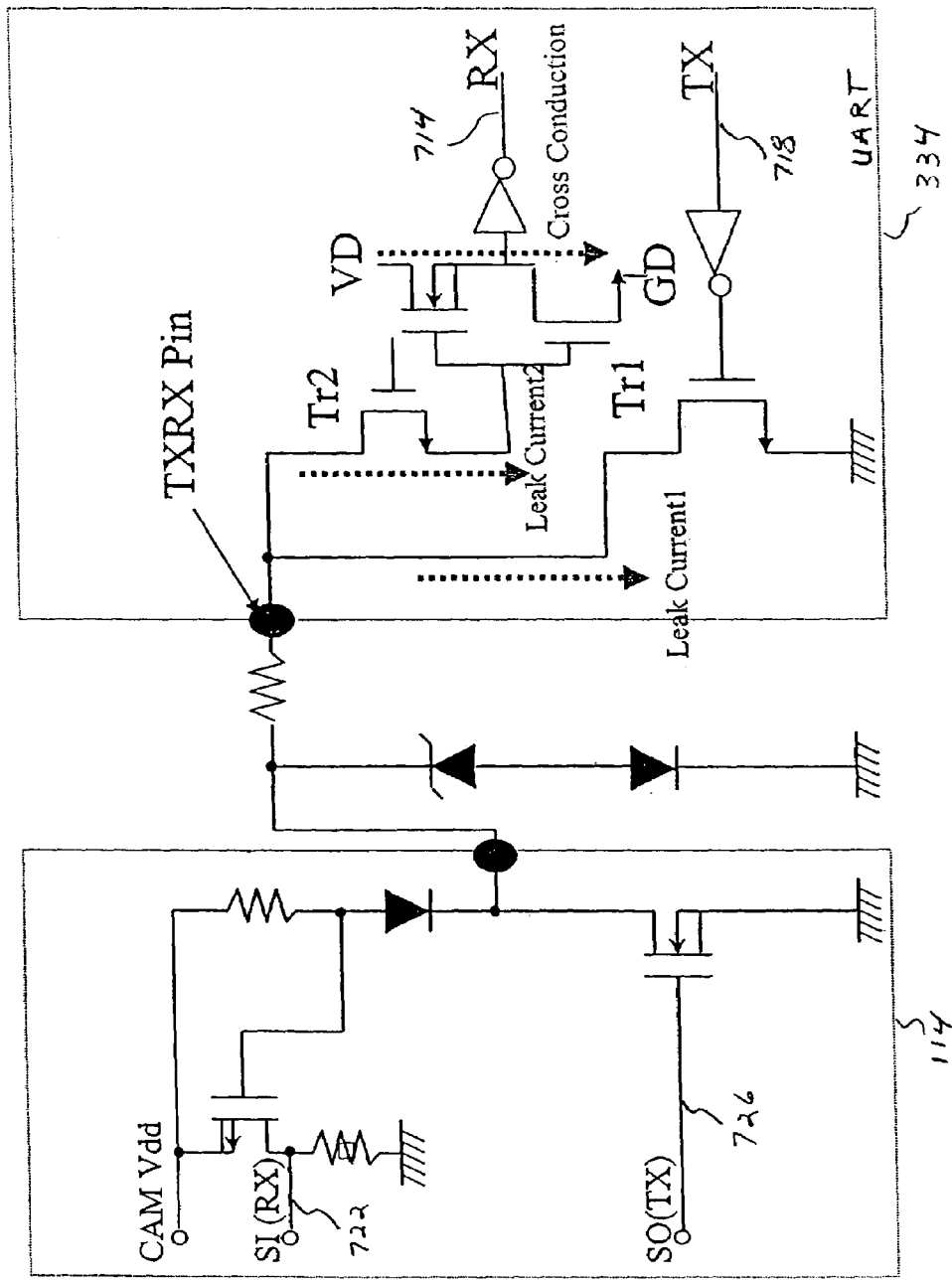
FIG. 7 is a schematic diagram of selected components from one embodiment of the UART of FIG. 3, in accordance with the present invention.

Referring now to FIG. 7, a schematic diagram of selected components from one embodiment of FIG. 3 UART 334 is shown, in accordance with the present invention. In alternate embodiments, the present invention may readily utilize include various components and configurations in addition to, or instead of, those discussed in conjunction with the FIG. 7 embodiment. In the FIG. 7 embodiment, battery controller 310 may utilize UART 334 to perform various bi-directional communications between battery controller 310 and appropriate external entities such as processor 226 of electronic device 114.

In the FIG. 7 embodiment, UART 334 may be advantageously implemented to communicate with electronic device 114 via a single transmit/receive (TXRX) pin on the integrated circuit device that contains battery controller 310. This single-pin UART interface thus conserves available connection pins on the integrated circuit device of battery controller 310. In the FIG. 7 embodiment, electronic device 114 may transmit information via SO(TX) line 726 to the TXRX pin. UART 334 may then receive the transmitted information from the TXRX pin via RX line 14. Conversely, UART 334 may transmit information via TX line 718 to the TXRX pin. Electronic device 114 may then received the transmitted information from the TXRX pin via SI(RX) line 722.

In the FIG. 7 embodiment, UART 334 may advantageously receive a timebase signal from instruction oscillator 338 (FIG. 3) of battery controller 310 for accurately generating a UART clock signal to synchronize operations in UART 334. Since the instruction oscillator 338 includes a precision timebase circuit that resides onboard the integrated circuit of battery controller 310, UART 334 therefore does not require an off-chip crystal oscillator to generate the foregoing timebase signal. In addition, extra connection(s) to support such an off-chip timebase source are not required in the FIG. 7 implementation of UART 334.

The invention has been explained above with reference to certain embodiments. Other embodiments will be apparent to those skilled in the art in light of this disclosure. For example, the present invention may readily be implemented using configurations and techniques other than those described in the embodiments above. Additionally, the present invention may effectively be used in conjunction with systems other than those described above. Therefore, these and other variations upon the discussed embodiments are intended to be covered by the present invention, which is limited only by the appended claims.

What is claimed is:

1. A system for effectively managing operating power for an electronic device, comprising:

a battery pack coupled to said electronic device for supplying said operating power to said electronic device; and a battery controller configured to alternately manage said battery pack in one of a single-cell implementation and a dual-cell implementation, said battery controller including a charge pump to provide an internal controller power supply for operating said battery controller in said single-cell implementation, said battery pack being implemented in said single-cell implementation, said battery controller coordinating a startup procedure for said battery pack during which a battery charger is connected to said battery pack in a discharged state, said battery controller responsively closing a charge switch that is coupled between said battery charger and a battery cell of said battery pack, said charge switch passing a charger voltage from said battery charger to a charger input of said charge pump, said charge pump responsively generating a charge pump output voltage at a pre-determined voltage level to a charger regulator that filters said charge pump output voltage, said charger regulator then generating said internal controller power supply so that a CPU of said battery controller may begin executing battery controller instructions to control operations of said battery pack.

2. The system of claim 1 wherein said CPU closes a discharge switch in said battery pack to begin charging said battery cell, said CPU also utilizing a CPSEL line to switch from said charger input of said charge pump to a battery input of said charge pump, said charge pump responsively generating said charge pump output voltage at said pre-determined voltage level to said charger regulator, said charger regulator filtering said charge pump output voltage to provide said internal controller power supply for said battery controller, said charge pump thus compensating for a reduced battery output voltage resulting from said single-cell implementation of said battery pack.

3. The system of claim 2 wherein said battery pack utilizes said battery charger under control of said battery controller to charge said battery cell, said battery charger being subsequently disconnected for more a unrestricted use of said electronic device, said electronic device utilizing said battery pack to supply said operating power.

4. A system for effectively managing operating power for an electronic device, comprising:
   a battery pack coupled to said electronic device for supplying said operating power to said electronic device; and
   a battery controller configured to alternately manage said battery pack in one of a single-cell implementation and a dual-cell implementation, said battery controller including a charge pump to provide an internal controller power supply for operating said battery controller in said single-cell implementation, an analog-to-digital converter module of said battery controller monitoring a battery voltage of said battery pack as it discharges while supplying said operating power to said electronic device, a CPU of said battery controller controlling a shutdown procedure for said battery pack when a pre-determined discharged voltage level is sensed by said analog-to-digital converter module, said CPU responsively opening a discharge switch in said battery pack, said CPU toggling a CPSEL line to switch from a battery voltage of said battery pack at a battery input of said charge pump to a charger voltage from said battery charger at a charger input of said charge pump to thereby generate said internal controller power supply, said internal controller power supply responsively descending below a reset threshold if said battery charger is not connected to said battery pack, said battery pack then entering a shutdown state until said battery charger is connected to said battery pack and a startup procedure is performed by said battery controller to charge said battery pack.

5. A system for effectively managing operating power for an electronic device, comprising:
   a battery pack coupled to said electronic device for supplying said operating power to said electronic device; and
   a battery controller configured to alternately manage said battery pack in one of a single-cell implementation and a dual-cell implementation, said battery controller including a charge pump to provide an internal controller power supply for operating said battery controller in said single-cell implementation, said battery controller including a UART device that is implemented to communicate with said electronic device via a single transmit/receive pin on an integrated circuit device that contains said battery controller, said UART thus supporting a single-pin UART interface to conserve available connection pins on said integrated circuit device of said battery controller, said UART device receiving a timebase signal from a precision instruction oscillator that is implemented on an integrated circuit that includes said battery controller, said instruction oscillator accurately generating a UART clock signal to said UART for synchronizing UART operations.

6. A method for effectively managing operating power for an electronic device, comprising the steps of:
   supplying said operating power for said electronic device from a battery pack coupled to said electronic device; and
   managing said battery pack alternately in one of a single-cell implementation and a dual-cell implementation by utilizing a battery controller that includes a charge pump to provide an internal controller power supply for operating said battery controller in said single-cell implementation, said battery pack being implemented in said single-cell implementation, said battery controller coordinating a startup procedure for said battery pack during which a battery charger is connected to said battery pack in a discharged state, said battery controller responsively closing a charge switch that is coupled between said battery charger and a battery cell of said battery pack, said charge switch passing a charger voltage from said battery charger to a charger input of said charge pump, said charge pump responsively generating a charge pump output voltage at a pre-determined voltage level to a charger regulator that filters said charge pump output voltage, said charger regulator then generating said internal controller power supply so that a CPU of said battery controller may begin executing battery controller instructions to control operations of said battery pack.

7. The method of claim 6 wherein said CPU closes a discharge switch in said battery pack to begin charging said battery cell, said CPU also utilizing a CPSEL line to switch from said charger input of said charge pump to a battery input of said charge pump, said charge pump responsively generating said charge pump output voltage at said pre-determined voltage level to said charger regulator, said charger regulator filtering said charge pump output voltage to provide said internal controller power supply for said battery controller, said charge pump thus compensating for a reduced battery output voltage resulting from said single-cell implementation of said battery pack.

8. The method of claim 7 wherein said battery pack utilizes said battery charger under control of said battery controller to charge said battery cell, said battery charger being subsequently disconnected for more a unrestricted use of said electronic device, said electronic device utilizing said battery pack to supply said operating power.

9. A method for effectively managing operating power for an electronic device, comprising the steps of:
   supplying said operating power for said electronic device from a battery pack coupled to said electronic device; and
   managing said battery pack alternately in one of a single-cell implementation and a dual-cell implementation by utilizing a battery controller that includes a charge pump to provide an internal controller power supply for operating said battery controller in said single-cell implementation, an analog-to-digital converter module of said battery controller monitoring a battery voltage of said battery pack as it discharges while supplying said operating power to said electronic device, a CPU of said battery controller controlling a shutdown procedure for said battery pack when a pre-determined discharged voltage level is sensed by said analog-to-digital converter module, said CPU responsively opening a discharge switch in said battery pack, said CPU toggling a CPSEL line to switch from a battery voltage of said battery pack at a battery input of said charge pump to a charger voltage from said battery charger at a charger input of said charge pump to thereby generate said internal controller power supply, said internal controller power supply responsively descending below a reset threshold if said battery charger is not connected to said battery pack, said battery pack then entering a shutdown state until said battery charger is connected to said battery pack and a startup procedure is performed by said battery controller to charge said battery pack.

10. A method for effectively managing operating power for an electronic device, comprising the steps of:

supplying said operating power for said electronic device from a battery pack coupled to said electronic device; and managing said battery pack alternately in one of a single-cell implementation and a dual-cell implementation by utilizing a battery controller that includes a charge pump to provide an internal controller power supply for operating said battery controller in said single-cell implementation, said battery controller including a UART device that is implemented to communicate with said electronic device via a single transmit/receive pin on an integrated circuit device that contains said battery controller, said UART thus supporting a single-pin UART interface to conserve available connection pins on said integrated circuit device of said battery controller, said UART device receiving a timebase signal from a precision instruction oscillator that is implemented on an integrated circuit that includes said battery controller, said instruction oscillator accurately generating a UART clock signal to said UART for synchronizing UART operations.

* * * * *